(12) United States Patent
Heitmann et al.

(10) Patent No.: US 10,492,364 B2
(45) Date of Patent: Dec. 3, 2019

(54) COMBINE HARVESTER

(71) Applicant: CLAAS Selbstfahrende Erntemaschinen GmbH, Harsewinkel (DE)

(72) Inventors: Christoph Heitmann, Warendorf (DE); Joachim Baumgarten, Beelen (DE); Christopher Vieregge, Doerentrup (DE); Christian Beulke, Harsewinkel (DE); Stefan Teroerde, Warendorf (DE); Bastian Bormann, Guetersloh (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 68 days.

(21) Appl. No.: 15/922,221

(22) Filed: Mar. 15, 2018

(65) Prior Publication Data
US 2018/0303030 A1  Oct. 25, 2018

(30) Foreign Application Priority Data

Apr. 25, 2017 (DE) .................. 10 2017 108 761

(51) Int. Cl.
*A01D 41/127* (2006.01)
*A01F 12/40* (2006.01)
(Continued)

(52) U.S. Cl.
CPC ....... *A01D 41/127* (2013.01); *A01D 41/1243* (2013.01); *A01D 43/085* (2013.01); *A01F 12/40* (2013.01)

(58) Field of Classification Search
CPC .. A01D 41/127; A01D 41/12; A01D 41/1243; A01D 43/085; A01F 12/40; A01F 29/00; A01F 29/09
(Continued)

(56) References Cited

U.S. PATENT DOCUMENTS 5,569,081 A   10/1996 Baumgarten et al.
7,455,584 B2 * 11/2008 Farley ................ A01D 41/1243
                                                          460/111

(Continued)

FOREIGN PATENT DOCUMENTS

DE   102013108292 A1   2/2015
DE   102014113965      3/2016
(Continued)

OTHER PUBLICATIONS

European Search Report dated Jul. 5, 2018 (with English translation).

*Primary Examiner* — Robert E Pezzuto
(74) *Attorney, Agent, or Firm* — Collard & Roe, P.C.

(57) ABSTRACT

A combine harvester having a chopper configured for chopping crop, which comprises a cutting cylinder fitted with chopper knives, a knife carrier fitted with counter knives, and a rasp bar arrangement. The counter knives and/or the rasp bar arrangement can be moved into a partial stream passing by the chopper. The harvester also has a crop spreading device configured for spreading the chopped-material stream emerging from the combine harvester on the ground in the rear region of the combine harvester, and a sensor unit configured for generating sensor data which represent at least one parameter influencing the spreading quality of the chopped-material stream emerging from the combine harvester. There is a control unit that adapts the (Continued)

position of the rasp bar arrangement and/or the counter knives depending on the spreading quality.

12 Claims, 3 Drawing Sheets

(51) Int. Cl.
    *A01D 41/12*     (2006.01)
    *A01D 43/08*     (2006.01)

(58) Field of Classification Search
    USPC ............. 56/10.2 R, 60; 241/25, 33; 460/111, 460/112; 701/50
    See application file for complete search history.

(56) References Cited

U.S. PATENT DOCUMENTS

| | | |
|---|---|---|
| 9,516,812 B2 | 12/2016 | Baumgarten et al. |
| 9,707,972 B2 | 7/2017 | Tuncer et al. |
| 2005/0059445 A1* | 3/2005 | Niermann .......... A01D 41/1243 460/112 |
| 2006/0191251 A1* | 8/2006 | Pirro .................... A01D 43/085 56/60 |
| 2012/0056024 A1* | 3/2012 | Isaac ....................... A01F 12/40 241/25 |
| 2013/0042591 A1* | 2/2013 | Behnke ................ A01F 29/095 56/10.2 A |
| 2015/0038201 A1* | 2/2015 | Brinkmann ............. A01F 12/40 460/112 |
| 2017/0055445 A1 | 3/2017 | Mahieu et al. |
| 2018/0084718 A1 | 3/2018 | Baumgarten et al. |

FOREIGN PATENT DOCUMENTS

| | | |
|---|---|---|
| EP | 0685151 | 12/1995 |
| EP | 1514466 | 3/2005 |
| EP | 1790207 | 5/2007 |
| EP | 2987396 A1 | 2/2016 |
| EP | 3138383 A1 | 3/2017 |
| EP | 3298880 A1 | 3/2018 |

* cited by examiner

COMBINE HARVESTER

CROSS-REFERENCE TO RELATED APPLICATIONS

This application claims priority under 35 USC 119 of German Application No. 10 2017 108761.3, filed on Apr. 25, 2017, the disclosure of which is herein incorporated by reference.

BACKGROUND OF THE INVENTION

The present invention relates to a combine harvester comprising a chopper configured for chopping crop, which comprises a cutting cylinder fitted with chopper knives, a knife carrier fitted with counter knives, and a rasp bar arrangement, wherein the counter knives and/or the rasp bar arrangement can be or are/is moved at least partially into a partial stream passing by the chopper, and comprising a crop spreading device configured for spreading the chopped-material stream emerging from the combine harvester on the ground in the rear region of the combine harvester. There is a sensor unit configured for generating sensor data which represent at least one parameter influencing the spreading quality of the chopped-material stream emerging from the combine harvester.

The non-grain proportion harvested by a combine harvester during the harvesting operation is often spread directly on the harvested territory, for example to improve the soil quality. In this connection, it is important that the crop, i.e., the straw, is obtained and discharged in such a way that it decays easily, so that its nutritive components are available in the subsequent vegetation phase. The decay is influenced by different factors, including external influences (inter alia, weather) and the soil composition (inter alia, microorganisms) and, in particular, the spreading quality. The spreading quality is determined by different parameters of the discharged crop, for example by the shape of the crop strand on the ground behind the combine harvester or by the length of the chopped material. For example, if the crop spread on the ground is in suitably short pieces and has been spread homogeneously across the working width of the combine harvester, decay is facilitated.

Diverse solutions, which are intended to satisfy these requirements, are known from the related art. For example, EP 0 685 151 A1 discloses a system in which the wind conditions in the region of the crop spreading device of the combine harvester are determined and the discharge behavior of the spreading device is regulated according to the wind conditions. Such a system has the advantage that a spreading of the broken straw-chaff mixture conveyed out of the combine harvester that is non-uniform due to cross winds is avoided or at least reduced.

EP 1 790 207 A1 describes a system in which the spreading of the chopped-material stream emerging from the combine harvester in the rear region thereof is regulated depending on the position of the crop edge. Such a system ensures that the portion of residual material to be spread on the ground is not discharged into a crop yet to be harvested, since this would have the disadvantage that already-threshed crop would be picked up again by a combine harvester.

EP 1 514 466 A1 further discloses a combine harvester which comprises a chopper and a spreading unit and accommodates an infrared camera in the rear region thereof, the infrared camera ascertaining the spreading quality of the broken straw-chaff mixture deposited on the ground on the basis of the detected temperature distribution, wherein higher temperatures are an indicator of a greater layer thickness. On the basis of the ascertained temperature change, kinematic parameters of the chopper and the spreading device are adapted in such a way that an approximately uniform temperature distribution sets in across the spreading width, which ultimately serves as an indicator of homogeneous crop spreading and, therefore, a high spreading quality.

Finally, reference is also made, by way of example, to DE 10 2014 113 965 A1 and DE 10 2016 118 187 A1, which has not been published yet, according to which the spreading of the chopped-material stream emerging from the combine harvester takes place depending on a selectable spreading strategy and, optionally, a lower-level substrategy.

One disadvantage of the above-described systems for influencing the spreading quality is that these systems require relatively complex ancillary units which also have a correspondingly high energy requirement.

SUMMARY OF THE INVENTION

The problem addressed by the present invention is that of designing and refining the known combine harvester in such a way that the spreading quality is optimized in the most efficient way possible.

This problem is solved by a combine harvester as described above, which comprises a control unit that adapts the position of the rasp bar arrangement and/or the counter knives depending on the spreading quality.

Of essential importance in this case is the finding that the spreading quality decisively depends on the chopping quality and can be influenced, in an easy way, by means of an optimal setting and control of the chopper of the combine harvester, which is present anyway. The chopping quality can be balanced out, in this case, in particular with respect to the energy requirement of the chopper, i.e., the straw in the chopper is chopped only to the extent necessary, in order to save energy. In this case, the necessary extent of chopping can be adjusted on the basis of a predefinable prioritization parameter, which is described in greater detail in the following.

In this way, according to the invention, the spreading quality of the chopped-material stream emerging from the crop spreading device in the rear region of the combine harvester, or parameters that are characteristic of the spreading quality, is/are detected with the aid of sensors, wherein corresponding sensor data are processed by a control unit and are utilized for implementing certain adjustments of the chopper. In this case, the position of the counter knives interacting with the chopper knives of the cutting cylinder and/or the position of the rasp bar arrangement in the chopper are/is each adapted to the ascertained spreading quality. Preferably, the adaptation of the particular position can also take place, in addition, based on parameters that are characteristic of the quality of the crop stream—which is a partial stream—fed to the chopper, such as the moisture, the level of maturity, the throughput of the crop, i.e., the straw, the material feed height of the crop or the straw in the feeder housing, etc.; these parameters can likewise be detected with the aid of sensors. In a particularly preferred way, the adaptation of the particular position can also be influenced, as mentioned above, by a strategic objective or a prioritization parameter, which an operator (driver) can select from a group comprising several different prioritization modes which are predefined in the control unit.

The counter knives, which are movably mounted in the chopper and are disposed, for example, on a movable knife carrier, can be moved into the flow channel to a greater or lesser extent or can be moved completely out of the flow channel, for the aforementioned adaptation purposes. The movement can be a swivel motion and/or a translatory motion of the counter knives and/or the knife carrier. With respect to the rasp bar arrangement, which comprises at least one rasp bar and a friction concave plate disposed upstream from the rasp bar arrangement in the direction of crop flow, the friction concave plate is moved, in particular, and not the rasp bar. The friction concave plate forms, in particular, a guide plate on the outer circumference of the flow channel, and therefore the rasp bar can be exposed to the crop stream to a more or less extent, or the crop stream can be conveyed completely past the rasp bar. The movement of the friction concave plate is, in particular, a pivot motion and/or a translatory motion.

The aformentioned control of the chopper, by means of which the counter knives and/or the rasp bar arrangement are/is adjusted, has a direct effect on the chopped-material stream emerging from the combine harvester and, therefore, also on the spreading quality. If the crop emerging from the chopper, i.e., the chopped material, tends to be in short pieces, this crop is spread, for example, flatter, on the ground behind the combine harvester, whereby this crop also comes into better contact with microorganisms in the soil. Crop that tends to be in short pieces also has another trajectory after emerging from the crop spreading device, which can influence, inter alia, the width of the material strip deposited on the ground, i.e., the crop strand, and/or its density (extent of coverage). By adapting the position of the counter knives and/or the rasp bar arrangement, the extent of defibration of the chopped material can also be increased, which facilitates a decomposition, by means of microorganisms, of the material spread on the ground.

These positive aspects of a crop stream influenced by adapting the position of the counter knives and/or the rasp bar arrangement are up against a correspondingly increasing energy requirement of the chopper. The energy requirement increases, the more the crop is chopped or defibrated. An increased moisture content and/or material feed height of the crop to be chopped can also increase the energy requirement. Since it is also desirable to keep the energy requirement of the working units of a combine harvester, in particular also the energy requirement of the chopper, as low as possible, the energy requirement of the chopper can also be controlled, in particular automatically, by the provision, according to the invention, of the above-described adjustment possibilities. In this way, it is possible, in particular, to reduce the extent of chopping by the chopper and, therefore, the energy requirement, in particular automatically, when the sensor unit establishes that there is a relatively good spreading quality. Only in the case that the spreading quality and, possibly, the crop quality worsens during the harvesting process, the extent of chopping in the chopper is increased by moving the counter knives into the flow channel or into the chopper drum and/or by releasing the rasp bar by folding back the friction concave plate, whereby the chopper consumes a correspondingly greater amount of energy. With the aid of the combine harvester according to the invention, the energy balance can also be optimized, wherein the crop is advantageously chopped only to the extent necessary.

According to one embodiment of the combine harvester, the control unit regulates the position of the rasp bar arrangement and/or the counter knives with respect to the target of a minimum energy requirement of the chopper and the target of a predetermined minimum chopping quality. As a result, a certain chopping quality is always ensured, but no energy above and beyond that which is required is consumed.

Preferably, a prioritization parameter is provided, which represents a prioritization between the target of a minimum energy requirement of the chopper and the target of a maximum chopping quality, wherein the control unit carries out the adaptation of the position of the rasp bar arrangement and/or the counter knives according to the prioritization parameter. Therefore, a weighting is provided between chopping quality on the one hand and energy requirement on the other hand (balancing the chopping quality with respect to the energy requirement).

According to another embodiment of the combine harvester, the control unit comprises an input/output unit, i.e., a unit which permits the entries or settings of an operator and/or which can display information to an operator, wherein the priorization parameter can be adjusted in a stepped or stepless manner via the input/output unit. The input/output unit preferably provides a virtual control element, in particular a drag-and-drop control element, which can be displayed via the input/output unit and via which the prioritization parameter can be adjusted.

Particularly preferably, the control element is a virtual sliding controller.

In particular, the sensor unit according to one embodiment of the combine harvester can ascertain, as a parameter influencing the spreading quality of the chopped-material stream emerging from the combine harvester, the width of the crop strand formed by the emerging crop, the height of the crop strand, the density and/or the extent of ground covered by the crop strand, the amount of crop that has emerged, the extent of defibration of the chopped material in the crop that has emerged, and/or the length of cut of the crop that has emerged. In this case, the "crop strand" means the chopped crop lying on the ground, which was previously fed, as the first partial stream, to the chopper and, after having been chopped, was discharged from the crop spreading device as a chopped-material stream.

The control unit can effectuate preferred sequences in the case of opposing prioritizations. In this way, when the priority is placed on maximum chopping quality, in response to an increase in the length of cut detected by the sensor unit, the control unit can advance the counter knives toward the chopper knives and/or control the position of the rasp bar arrangement in such a way that the rasp bar arrangement interacts with the partial stream to a greater extent. In contrast, when the priority is placed on a minimum energy requirement, the control unit, independently of the sensor data from the sensor unit, can move the counter knives away from the chopper knives and control the position of the rasp bar arrangement in such a way that the rasp bar arrangement interacts with the partial stream to a reduced extent or not at all.

According to another embodiment of the combine harvester, the sensor unit has a detection range which is directed onto the crop or crop strand which has emerged and is lying on the ground behind the combine harvester, and/or which is directed onto the crop which has emerged and is in flight.

In addition to the aforementioned sensor unit which monitors the spreading quality, yet another sensor unit can be provided, which monitors the quality of the partial stream to be chopped, or of the straw therein, with the aid of sensors. In particular, the further sensor unit can ascertain the level of maturity, the moisture content, and/or the kind of crop as a parameter which influences or characterizes the quality of the partial stream to be chopped. It is also possible to ascertain the straw throughput and/or the material feed height of the straw to be chopped at at least one point within the combine harvester, in particular in the feeder housing of the combine harvester, or at at least one working unit of the combine harvester.

When a priority is placed on a maximum chopping quality, it can be provided that the control unit, in response to an increase in the moisture content of the crop detected by the further sensor unit, advances the counter knives toward the chopping knives and/or controls the position of the rasp bar arrangement in such a way that the rasp bar arrangement interacts to a greater extent with the crop or the partial stream to be chopped. In this way, an increasing moisture content of the crop results in an undesirable increase in the length of cut, which can be compensated for by means of the adjustment possibilities according to the invention.

Some embodiments of the sensor or sensors of the particular sensor unit can be an image recording unit and/or a moisture sensor in this case.

BRIEF DESCRIPTION OF THE DRAWINGS

The invention is explained in greater detail in the following with reference to a drawing representing only one exemplary embodiment. In the drawing.

DETAILED DESCRIPTION OF THE EMBODIMENTS

Figure 1:
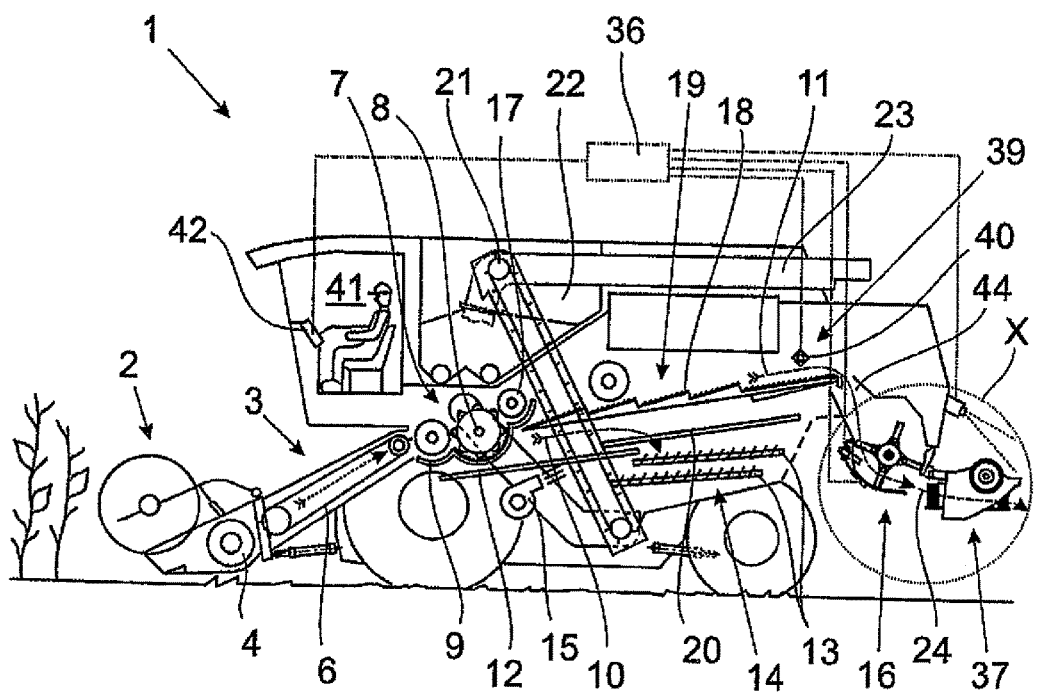
FIG. 1 shows a combine harvester according to the present Invention during travel through a crop field.

The combine harvester schematically represented in FIG. 1 accommodates, in the front region thereof, a front attachment header 2 designed as a grain cutterbar, which is connected to a feeder 3 in a manner known per se. The cross auger component 4 of the header 2 transfers the crop 5 picked up by the header to the feeder 3, wherein the feeder transfers the crop 5, in the upper, rear region thereof, by means of a circulating conveyor 6, to the threshing unit 7 of the combine harvester 1. In the threshing unit 7, which comprises one cylinder or several cylinders, the crop 5 is conveyed-through between the threshing cylinders 8 and a threshing concave 9, which at least partially surrounds the threshing cylinders, thereby separating the crop into at least two partial streams 10, 11. The first partial stream 10 is substantially composed of grain, short straw, and chaff, and is fed, via a grain pan 12, directly to a cleaning device 14 which comprises various sieve levels 13. The cleaning device 14 also accommodates a fan unit 15 which generates an air flow which passes through the sieve levels 13.

The second partial stream 11, which substantially comprises straw and, possibly, a residual portion of grain, and which emerges from the threshing unit 7 in the rear region thereof, is directed by means of a straw guide cylinder 17 to a separating device 19 designed as a tray-type shaker 18. Via the oscillating motion of the tray-type shaker 18, a large portion of the grain contained in the straw layer is separated out on the tray-type shaker 18 and is transferred via a so-called return pan 20 and the grain pan 12 to the cleaning device 14. The separating device 19 can also be designed, in a known manner, as an axial separating device comprising one or more separating rotors.

Finally, in the cleaning device 14, a cleaned grain flow comprising the various crop streams 10, 11 introduced into the cleaning device is conveyed by means of conveyor elevators 21 into a grain tank 22 and is temporarily stored therein. The grain tank 22 is generally emptied by means of a grain tank unloading conveyor 23. By means of the oscillating movement of the straw walker racks, the crop 5 transferred from the threshing parts 7 to the tray-type shaker 18 is conveyed thereon in the form of a series of throwing movements and finally, in the rear region of the tray-type shaker 18, is transferred as a partial stream 11, which substantially contains only straw, in the direction of a downstream chopper 16. The further handling of the partial stream 11 is described in the following with reference to FIG. 2.

Figure 2:
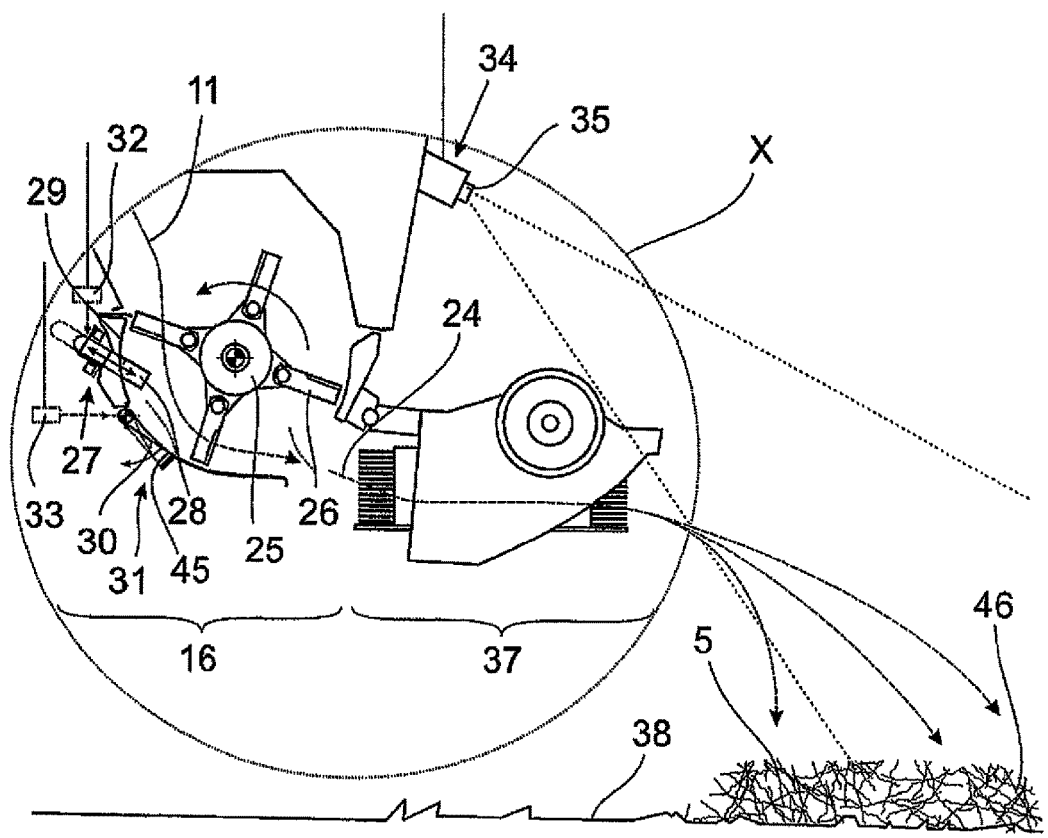
FIG. 2 shows a detailed view of a rear part of the combine harvester comprising a chopper and a crop spreading device.

The representation in FIG. 2 shows a schematic detailed view X of the chopper 16. The chopper 16 comprises a cutting cylinder 25 including knives 26 disposed thereon in the form of free-swinging knives, as well as a knife carrier 27, on which counter knives 28 are disposed and which can be brought into engagement, in sections, with the free-swinging knives 26 on the cutting cylinder 25, and comprises a separate plate section 29 which extends, in sections, in the circumferential direction of the cutting cylinder 25 and includes slots in the surface thereof, which extend, in sections, in the circumferential direction, behind which plate section the knife carrier 27, including the counter knives 28, is disposed, which counter knives can extend through the slots, and comprises a friction concave plate 30 as well as a rasp bar 45 which abuts the friction concave plate 30 as viewed in the circumferential direction. An actuator system 32, 33 is assigned to the knife carrier 27 and to the friction concave plate 30, respectively, in order to permit the knife carrier and the friction concave plate to be adjusted independently of one another without the use of tools.

As is clear from the representation in FIG. 2, the plate section 29, the friction concave plate 30, and the rasp bar 45 extend substantially coaxially to the rotational axis of the cutting cylinder 25. These elements of the chopper 16 are used for guiding the partial stream 11 and for influencing the chopping procedure during the processing of the straw, which has been transferred from the tray-type shaker 18, by the chopper 16. Different measures can be implemented in order to influence the chopping procedure and, therefore, the spreading quality of the chopped-material stream 24, i.e., the chopped crop or straw 5, emerging from the rear region of the combine harvester 1, as explained in the following.

Independently of sensor data which are generated by a sensor unit 34 and are based on a spreading quality, which is detected by at least one sensor 35 of the sensor unit 34, or on at least one parameter influencing or characterizing the spreading quality, a control unit 36 effectuates the adjustment of a certain position of the counter knives 28 and/or the rasp bar arrangement 31. For example, the straw in the crop stream 11 can be cut using a free cut, i.e., without assistance from the counter knives 28. In this case, the counter knives 28 are disposed in a retracted position. In this case, the counter knives 28 can be disengaged from the free-swinging knives 26 by way of the knife carrier 27, which is disposed behind the plate section 29, being movable, i.e., displaceable in a translatory manner in this case, away from the cutting cylinder 25 to such an extent that the counter knives 28 have retracted completely with respect to the surface of the plate section 29 (indicated by a dashed line). In the end, this position of the knife carrier 27 results in a comparably great length of cut. The counter knives 28 can also be brought into a maximally protruding position, however, by means of the knife carrier 27 (indicated by a solid line). In this position, the length of cut becomes significantly shorter. In addition, intermediate positions between the retracted position and the maximally protruding position can be set, in which the counter knives 28 are likewise disposed in a protruding position and protrude to different extents with respect to the surface of the plate section 29, which results in different lengths of cut.

The length of cut can also be influenced by a swiveling of the friction concave plate 30. The maximum swiveling of the friction concave plate 30 toward the cutting cylinder 25 brings the rasp bar 45 into a position that is covered, in the direction of crop flow, by the friction concave plate 30 (indicated by a solid line), which results in a greater length of cut, while swiveling the friction concave plate 30 away from the cutting cylinder 25 brings the rasp bar 45 into one of, possibly, several protruding positions (indicated by a dashed line), which results in a shorter length of cut. The extent of defibration of the straw in the discharged chopped-material stream 24 can also be changed in this way. By means of the swiveling, the rasp bar 45, which is disposed downstream from the friction concave plate 30 as viewed in the direction of crop flow, is brought into engagement with the partial stream 11 to a different extent. The greater the spacing of the friction concave plate 30 is in the radial direction with respect to the cutting cylinder 25, the greater the influence is that the rasp bar 45 can exert on the partial stream 11, with which the rasp bar 45 can be engaged to an increasing extent. During the adjustment of the friction concave plate 30 as well, various positions, which correspond to the various protruding positions of the rasp bar 45, can be set, in order to implement different lengths of cut, by way of the rasp bar 45 being engagable with the partial stream 11 to a different extent.

After passing through the chopper 16, the chopped crop stream, i.e., the chopped-material stream 24, is discharged via a crop spreading device 37 in the rear region of the combine harvester 1 and is spread on the ground 38. The spreading quality of the chopped-material stream 24 emerging from the combine harvester 1 is monitored by the sensor unit 34 and the sensor 35 during the harvesting operation and is detected on the basis of spreading quality parameters. If there is an indication of a worsening of the spreading quality due, for example, to an inhomogeneous distribution of the chopped-material stream 24 on the ground 38, this is ascertained by the sensor 35 and the sensor unit 34 generates corresponding sensor data. The sensor data are transmitted to the control unit 36 which, as a countermeasure, adjusts the knife carrier 27 and the counter knives 28 and/or the friction concave plate 30 in such a way that the length of cut is shortened, as described above. As a result, the energy requirement of the chopper 16 simultaneously increases. If the spreading quality of the chopped-material stream 24 emerging from the combine harvester 1 improves, however, this is likewise identified by the sensor 35 and corresponding sensor data are transmitted by the sensor unit 34 to the control unit 36 which then adjusts the knife carrier 27 and the counter knives 28 and/or the friction concave plate 30 in the opposite direction in such a way that the length of cut increases again. Therefore, the energy requirement of the chopper 16 also decreases again. As a result, the control unit 36 can therefore control the position of the rasp bar arrangement 31 and/or the counter knives 28 with respect to the target of a minimum energy requirement of the chopper 16 and the target of a predetermined minimum chopping quality, in particular with consideration for a minimum length of cut.

The sensor 35, which, in this case, comprises an image recording unit and is designed as a camera, is configured, in this case and preferably, for detecting, as a parameter influencing the spreading quality, the width of the crop strand 46 formed by the emerging crop 5 or chopped-material stream 24, the height or thickness of the crop strand 46, the density or the extent of the ground coverage of the crop strand 46, the amount or the mass and/or the volume per unit of area of the crop strand 46, the extent of defibration of the chopped material in the crop 5 that has emerged, and/or the length of cut in the crop 5 that has emerged. In principle, multiple sensors 35 can also be provided, which detect parameters that differ, in particular, from the aforementioned parameters.

In addition to the above-described adjustment process based on a detected spreading quality according to sensor data, it is also conceivable to provide yet another sensor unit 39 comprising yet another sensor 40, wherein the further sensor unit 39 detects parameters or properties that influence or characterize the partial stream 11 fed to the chopper 16 and/or the chopped-material stream 24 emerging from the chopper, in order to infer therefrom the quality of the partial stream 11 or the straw forming the partial stream. The correspondingly generated sensor data, which the further sensor unit 29 likewise transmits to the control unit 36, can likewise be taken into account by the control unit 36 during the adjustment of the relative positions of the counter knives 28 and/or the rasp bar arrangement 31 according to the above-described principle. For example, the at least one further sensor 40 can be configured for ascertaining, as a parameter characterizing the quality of the partial stream 11, the moisture content of the crop or the straw 5, in particular by means of a moisture sensor, and/or the level of maturity and/or the kind of crop, in particular by means of an image recording device. It is also conceivable that the crop throughput and/or the material feed height of the crop 5 is detected, as an operating parameter of the combine harvester 1, at at least one point within the combine harvester 1, in particular in the feeder housing of the combine harvester 1, or at at least one working unit.

Figure 3:
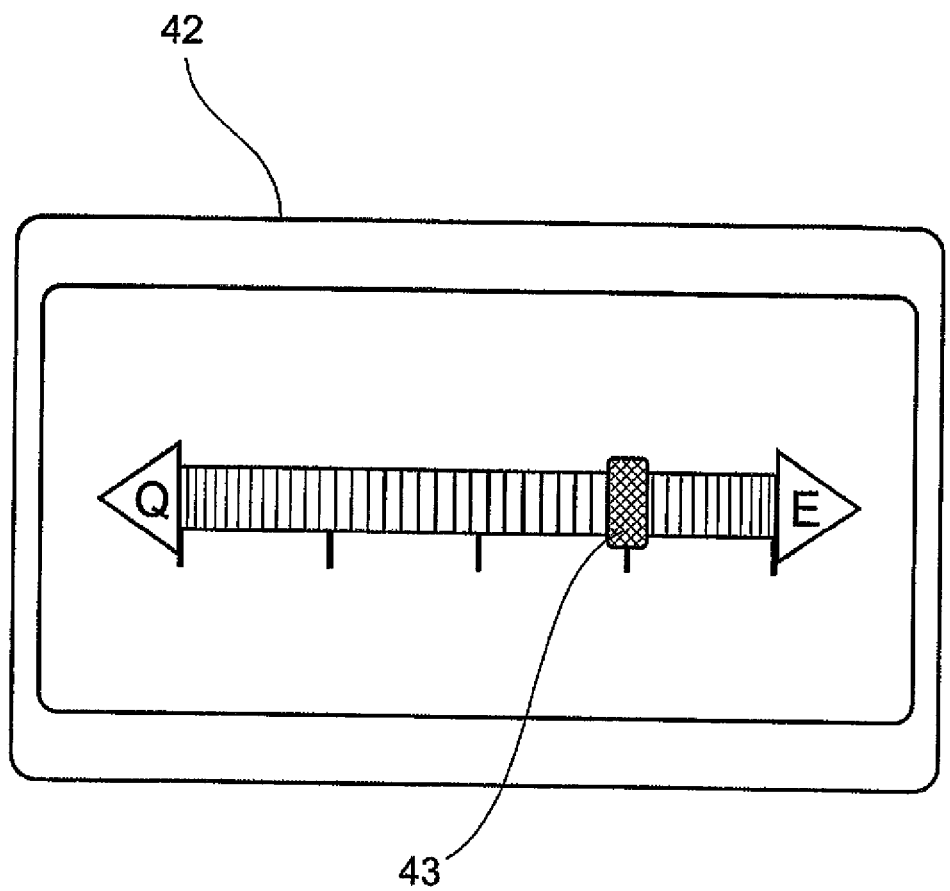
FIG. 3 shows a schematic view of an input/output unit of the combine harvester.

Finally, FIG. 3 schematically shows that the control unit 36 is preferably configured in such a way that an operator can select between various driving strategies (prioritizations) in the form of predefined prioritization modes, in particular automatic operation modes. In this case, the selection takes place, in particular, via an input/output unit 42 of the type shown in FIG. 3, which is connected to the control unit 36 and is designed as a touchscreen in this case, by way of example. A prioritization parameter can be adjusted in a stepped or stepless manner via the input/output unit 42. To this end, the input/output unit 42 comprises a virtual control element 43, specifically a drag-and-drop control element in the form of a virtual sliding controller in this case.

The adjustable prioritization parameter represents a prioritization between the target of a minimum energy requirement of the chopper 16 and the target of a maximum chopping quality, wherein the control unit 36 carries out the adaptation of the position of the rasp bar arrangement 31 and/or the counter knives 28 according to the prioritization parameter, in the above-described way.

The various priorization modes which can be set via the virtual control element 43 are all directed, to differing extents, to maintaining an optimal chopping quality, on the one hand and, on the other hand, to an energy-efficient operation of the chopper 16 and/or the combine harvester 1. It is conceivable, in particular, that, in one case, greater emphasis can be placed on an optimum chopping quality (in FIG. 3, the scale range extending from the middle of the scale toward the left), in another case, greater emphasis can be placed on an energy-efficient operation (in FIG. 3, the scale range extending from the middle of the scale toward the right), and/or, in yet another case, greater emphasis can be placed on a neutral setting (in FIG. 3, the middle of the scale).

For example, the driving strategies or prioritization modes of "very high chopping quality", "high chopping quality", "neutral", "low energy requirement", and "very high energy requirement" are predefined and the operator can freely select therefrom. In FIG. 3, by way of example, a driving strategy has been set that is focused primarily, but not completely, on an energy-efficient operation, namely the "low energy requirement" driving strategy in this case. The control unit 36 is configured, in this case and preferably, in such a way that the adjustment of the position of the rasp bar arrangement 31 and/or the counter knives 28 based on the various sensor data takes place depending on the selected prioritization mode.

LIST OF REFERENCE SIGNS 1 combine harvester
2 header in the form of a grain cutterbar
3 feeder
4 cross auger component
5 crop or straw
6 circulating conveyor
7 threshing unit
8 cylinder
9 threshing concave
10 first partial stream
11 second partial stream
12 grain pan
13 sieve levels
14 cleaning device
15 fan unit
16 chopper
17 straw guide cylinder
18 tray-type shaker
19 separating device
20 return pan
21 conveyor elevator
22 grain tank
23 grain tank unloading conveyor
24 chopped-material stream
25 cutting cylinder
26 chopper knife
27 knife carrier
28 counter knives
29 plate section
30 friction concave plate
31 rasp bar arrangement
32 actuator system for knife carrier
33 actuator system for friction concave plate
34 sensor unit
35 sensor
36 control unit
37 crop spreading device
38 ground
39 further sensor unit
40 further sensor
41 cab
42 input/output unit
43 virtual control element
44 feeder housing
45 rasp bar
46 crop strand on the ground

What is claimed is:

1. A combine harvester comprising:
   a chopper configured for chopping crop, which comprises a cutting cylinder fitted with chopper knives, a knife carrier fitted with counter knives, and a rasp bar arrangement, wherein the counter knives or the rasp bar arrangement are adapted to be moved at least partially into a partial stream passing by the chopper,
   a crop spreading device configured for spreading the chopped-material stream emerging from the combine harvester on the ground in a rear region of the combine harvester,
   a sensor unit configured for generating sensor data which represent at least one parameter influencing a spreading quality of the chopped-material stream emerging from the combine harvester, wherein the sensor unit senses a distribution of the chopped material stream emerging from the combine harvester, and has a detection range which is directed onto crop which has emerged and is lying on the ground or which has emerged and is in flight, and
   a control unit configured for adapting a position of the rasp bar arrangement or the counter knives depending on the spreading quality sensed by the sensor unit.

2. The combine harvester as claimed in claim 1, wherein the control unit regulates the position of the rasp bar arrangement or the counter knives with respect to a target of a minimum energy requirement of the chopper and a target of a predetermined minimum chopping quality.

3. The combine harvester as claimed in claim 2, wherein the control unit utilizes a prioritization parameter, which represents a prioritization between the target of a minimum energy requirement of the chopper and a target of a maximum chopping quality, such that the control unit carries out the adaptation of the position of the rasp bar arrangement or the counter knives according to the prioritization parameter.

4. The combine harvester as claimed in claim 3, wherein the control unit comprises an input/output unit and the prioritization parameter can be adjusted in a stepped or stepless manner via the input/output unit.

5. The combine harvester as claimed in claim 4, wherein the input/output unit provides a virtual control element that is displayed via the input/output unit, and wherein the virtual control element provides for adjustment of the prioritization parameter.

6. The combine harvester as claimed in claim 3, wherein the sensor unit is configured for ascertaining, as a parameter influencing the spreading quality of the chopped-material stream emerging from the combine harvester, a width of a crop strand formed by the crop that has emerged, a height of the crop strand, a density or extent of ground covered by the crop strand, amount of crop that has emerged, extent of defibration of the chopped material in the crop that has emerged, or a length of cut in the crop that has emerged.

7. The combine harvester as claimed in claim 3, wherein the control unit is configured to advance the counter knives toward the chopping knives or control the position of the rasp bar arrangement in such a way that the rasp bar arrangement interacts with the partial stream to a greater extent when the prioritization parameter is selected in such a way that a prioritization in favor of the maximum chopping quality takes place, in response to an increase in a length of cut detected by the sensor unit.

8. The combine harvester as claimed in claim 3, wherein the control unit is configured so that, independently of the sensor data from the sensor unit, the control unit moves the counter knives away from the chopping knives and controls the position of the rasp bar arrangement in such a way that the rasp bar arrangement interacts with the partial stream to a reduced extent or not at all when the prioritization parameter is selected in such a way that a prioritization in favor of the minimum energy requirement takes place.

9. The combine harvester as claimed claim 1, further comprising a further sensor unit that generates sensor data which represent at least one parameter influencing the quality of the partial stream fed to the chopper.

10. The combine harvester as claimed in claim 9, wherein the further sensor unit is configured for ascertaining, as a parameter influencing the quality of the partial stream, a level of maturity, a moisture content, a kind of crop, a throughput, or a material feed height of the crop in the feeder housing of the combine harvester.

11. The combine harvester as claimed in claim 10, wherein, the control unit is configured such that when a priority is placed on a maximum chopping quality, the control unit, in response to an increase in moisture content of the crop detected by the sensor unit, advances the counter knives toward the chopping knives or controls the position of the rasp bar arrangement in such a way that the rasp bar arrangement interacts to a greater extent with the partial stream.

12. The combine harvester as claimed in claim 9, wherein at least one of the sensor unit and the further sensor unit comprises at least one of an image recording unit and a moisture sensor.

\* \* \* \* \*